Patented Aug. 2, 1938

2,125,381

UNITED STATES PATENT OFFICE

2,125,381

STABILIZATION OF CHLORINATED COMPOUNDS

Arthur A. Levine and Oliver W. Cass, Niagara Falls, N. Y., assignors to E. I. du Pont de Nemours & Company, Wilmington, Del., a corporation of Delaware No Drawing. Application March 8, 1937,
Serial No. 129,684

5 Claims. (Cl. 23—250)

This invention relates to the stabilization of chlorinated hydrocarbons. More particularly, it relates to the stabilization of the chlorinated hydrocarbon, trichlorethylene, $C_2HCl_3$.

The chemical changes which occur in the chlorinated hydrocarbon, trichlorethylene, upon storage or during use of the solvent for commercial or industrial purposes, result in the development of acidity in the product. The amount of acid developed, which is readily determined by titration with a base, is an index of the degree of decomposition of the solvent.

While many chlorinated hydrocarbons which are commercially employed for various solvent purposes are subject to decomposition as the result of hydrolysis occurring during storage or use, the decomposition of trichlorethylene is not the result of any chemical reaction with the water which may be present in greater or less amounts in the liquid. While solvents, such as carbon tetrachloride, tend to decompose upon standing or during use as the result of the action of water on the chlorinated compound, trichlorethylene is not subject to chemical decomposition in this manner. It has been observed, however, that considerable quantities of acid will develop in a batch of trichlorethylene, during a period of use or storage, unless that solvent has previously been stabilized by the addition thereto of some stabilizing agent. As a result of observations carried out in connection with the formation of acid substances in trichlorethylene incident to storage or use of that chlorohydrocarbon, i. e. decomposition of the solvent, it has been concluded that the decomposition is an oxidation phenomenon. Inasmuch as this type of decomposition is not encountered with those chlorohydrocarbons subject to the carbon tetrachloride type of decomposition, it follows that the stabilizers employed for stabilizing trichlorethylene against decomposition must be different from those used for carbon tetrachloride stabilization.

Since trichlorethylene is widely used in industrial establishments for various purposes, such as the degreasing or cleaning of metals prior to plating, and in dry cleaning establishments for the dry cleaning of textile fabrics, it has been usual to stabilize trichlorethylene against decomposition during storage or use. As a result of experiments on the stabilization of the chlorinated hydrocarbons, certain characteristics have been found to be essential in any stabilizer which is to prove effective. However, to date, no one stabilizer has been entirely suitable for all batches of solvent. One of the reasons for this is the wide variety of uses to which the solvent is put in industrial establishments. Trichlorethylene is such an excellent solvent that it is used for a wide variety of commercial operations including detergent uses, as a vehicle for impregnating agents in coating or impregnating processes, for the extraction of oils, fats and waxes of animal, mineral or vegetable origin, in the treatment of mineral oils, for metal degreasing operations, for dry-cleaning textile fabrics, as a solvent in various chemical manufacturing operations and for many other similar purposes. Certain of the stabilizers for trichlorethylene now known function more effectively when the solvent is used for one purpose or in one type of machine, and some function with greater effectiveness when the solvent is used for other purposes. Accordingly, it has been usually necessary to select stabilizers for the trichlorethylene in accordance with the use to which the solvent is to be put or, as an alternative, to include several stabilizers to insure satisfactory stability of the chlorohydrocarbon under varying conditions of storage or use.

We have now found that one specific stabilizer for trichlorethylene is sufficient by itself to stabilize this chlorohydrocarbon against chemical decomposition when the solvent is employed for almost any commercial use. We have found that when this stabilizing agent is present in small amounts in the solvent, it is unnecessary to employ several stabilizers to insure satisfactory stability of the chlorinated hydrocarbon, as the single agent may be termed of universal stabilizing activity.

The single stabilizer which we have found effective for stabilizing trichlorethylene under all conditions encountered in the commercial utilization of this solvent is the compound, triphenyl guanidine, $C_6H_5N=C(NHC_6H_5)_2$. Triphenyl guanidine, when present in small amounts in trichlorethylene, amounts ranging from 0.001% to 0.1% by weight based on the weight of trichlorethylene stabilized, has been found to prevent the development of any substantial quantity of acidity in the solvent over reasonable periods of storage or use. This action is an inhibiting action, i. e. a form of anti-catalysis.

The advantages of being able to utilize a single stabilizer, regardless of the purpose for which the trichlorethylene is subsequently utilized, are immediately obvious. We have observed that triphenyl guanidine is an efficient stabilizer regardless of whether the trichlorethylene is utilized for degreasing, for dry-cleaning textile fabrics, for extracting vegetable or mineral oils, fats or waxes, for impregnation, or for any other purpose. It is, however, not volatile with the chlorinated hydrocarbon and where the trichlorethylene is subjected to distillation and condensation, as is usual in processes for purifying and recovering the solvent after use, it must be remembered that the triphenyl guanidine will remain behind in the residue and will not be found in the purified condensate. For this reason it is necessary to add a new amount of triphenyl guanidine to the purified condensate, before subjecting the purified solvent to re-use for any commercial solvent purpose. However, in the distillation of trichlorethylene it is advantageous that the residue shall at all times contain an adequate amount of the stabilizer. The property of triphenyl guanidine of remaining behind in the residue since it is not volatile with the chlorinated hydrocarbon renders it especially valuable as a stabilizer.

The following table shows the superiority of triphenyl guanidine over various other stabilizers when employed for the stabilization of trichlorethylene. In each case an amount of each stabilizer equivalent to 0.01% by volume, based on the volume of the chlorinated hydrocarbon, was added and the samples then stored in direct sunlight for the periods indicated. At the conclusion of each of these periods the amount of acid present in 25 cubic centimeter samples of each batch of solvent was determined by titration with 0.01 normal sodium hydroxide solution.

chemical decomposition. As previously specified, however, we prefer to use amounts ranging from 0.0001% to 0.1% by weight, and ordinarily our preferred range is from 0.01% to 0.05%.

Since various changes or modifications may be made in our invention as disclosed, such as changing the proportions or amounts of the stabilizer utilized in the trichlorethylene, our invention is not to be restricted except as necessitated by the prior art and appended claims.

We claim:

1. A composition of matter comprising trichlorethylene and stabilizing amounts of triphenyl guanidine.

2. A composition of matter comprising trichlorethylene and from 0.001 to 0.1% of triphenyl guanidine, said amount being by weight based on the weight of said trichlorethylene.

3. A composition of matter comprising trichlorethylene and triphenyl guanidine dissolved therein, said triphenyl guanidine being present in amounts ranging from 0.01 to 0.05% by weight based on the weight of said trichlorethylene.

4. Trichlorethylene stabilized by the addition thereto of triphenyl guanidine in stabilizing amounts.

*Quantity of 0.01 N NaOH required to neutralize acidity in 25 cc. sample after specified period of storage in direct sunlight*

| Compound tested | 56 hrs. | 200 hrs. | 296 hrs. | 404 hrs. | 668 hrs. | 200 days | Remarks |
|---|---|---|---|---|---|---|---|
| Unstabilized trichlorethylene | Cc. 75 | Cc. 110 | Cc. 185 | Too acid to titrate. | | | Colorless. |
| Trichlorethylene stabilized with 0.01% triphenyl guanidine. | 1.0 | 1.0 | 1.0 | 1.0 cc | 1.0 cc | 2.0 cc | Very faint yellow; no residual odor. |
| Trichlorethylene stabilized with 0.01% thymol. | 6.0 | 15.0 | 15.0 | Too acid to titrate. | | | Colorless. |
| Trichlorethylene stabilized with 0.01% ortho-benzyl-phenol. | 1.0 | | | 12.0 cc | 27.0 cc | Too acid to titrate. | Color bad after two weeks. |
| Trichlorethylene stabilized with 0.01% carvacrol. | 0.5 | 4.0 | | 27 cc | Too acid to titrate. | | Colorless. |

Our invention is not to be restricted to any specific proportions or amounts of stabilizer as all amounts ranging from a small fraction of one per cent up to 1% of triphenyl guanidine by weight have been found satisfactory for stabilizing the chlorinated hydrocarbon against 5. A process of stabilizing trichlorethylene which involves dissolving therein, in stabilizing amounts, triphenyl guanidine.

ARTHUR A. LEVINE.
OLIVER W. CASS.